March 9, 1937. T. C. STEIMER 2,073,571
GLASSWORKING APPARATUS
Filed Feb. 12, 1910 10 Sheets—Sheet 1
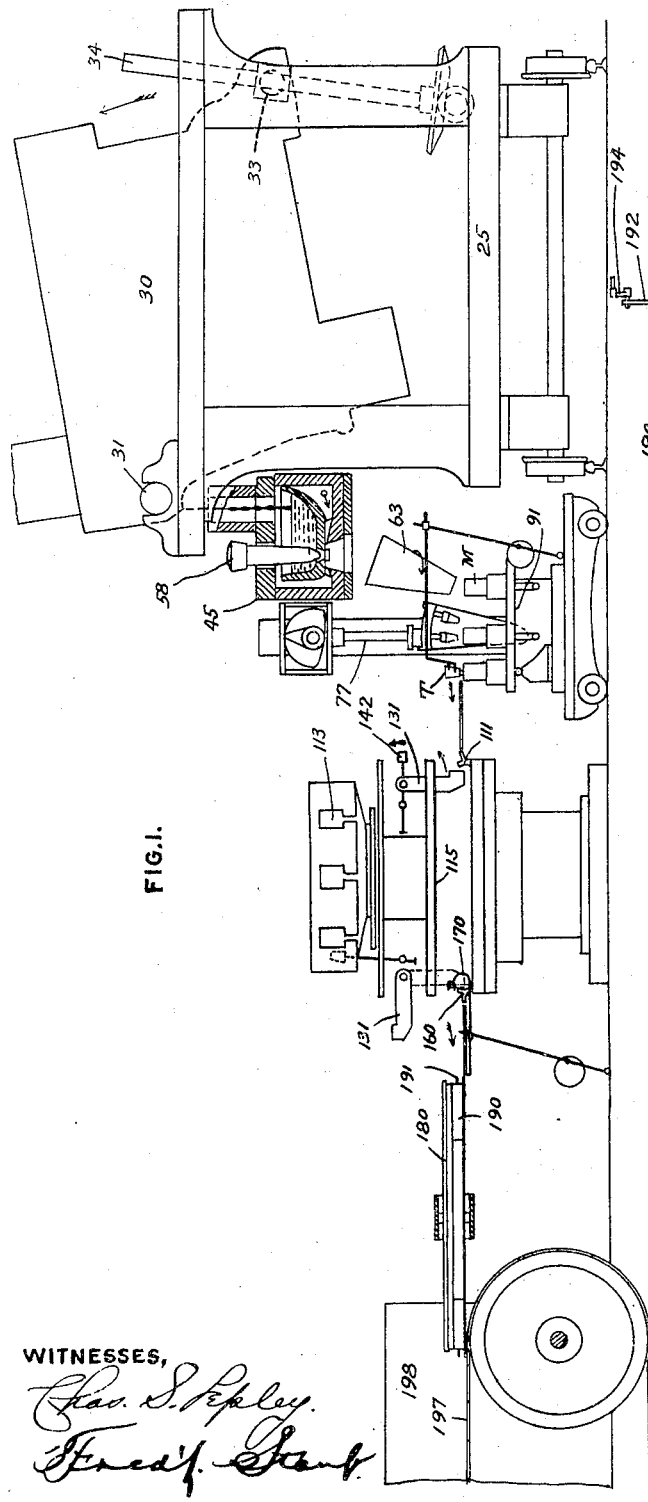
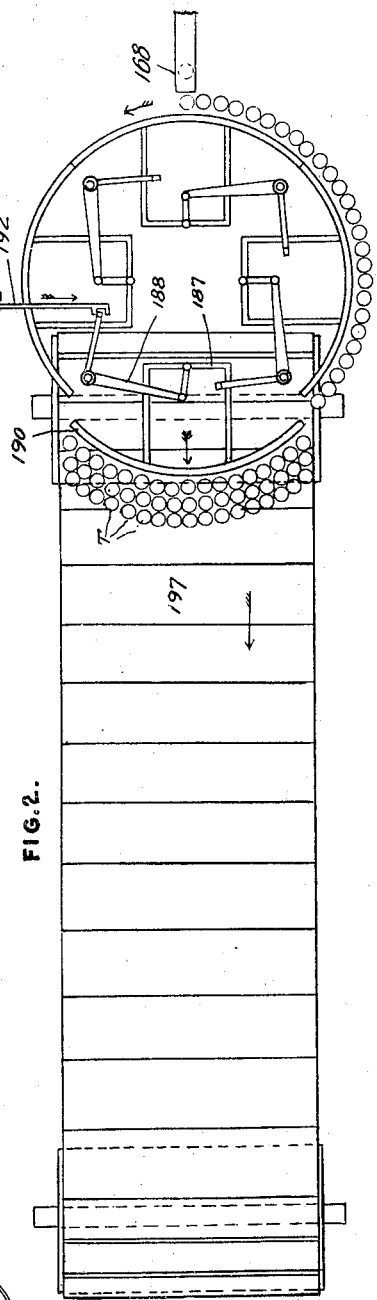
WITNESSES,
INVENTOR,
Theodore C. Steimer

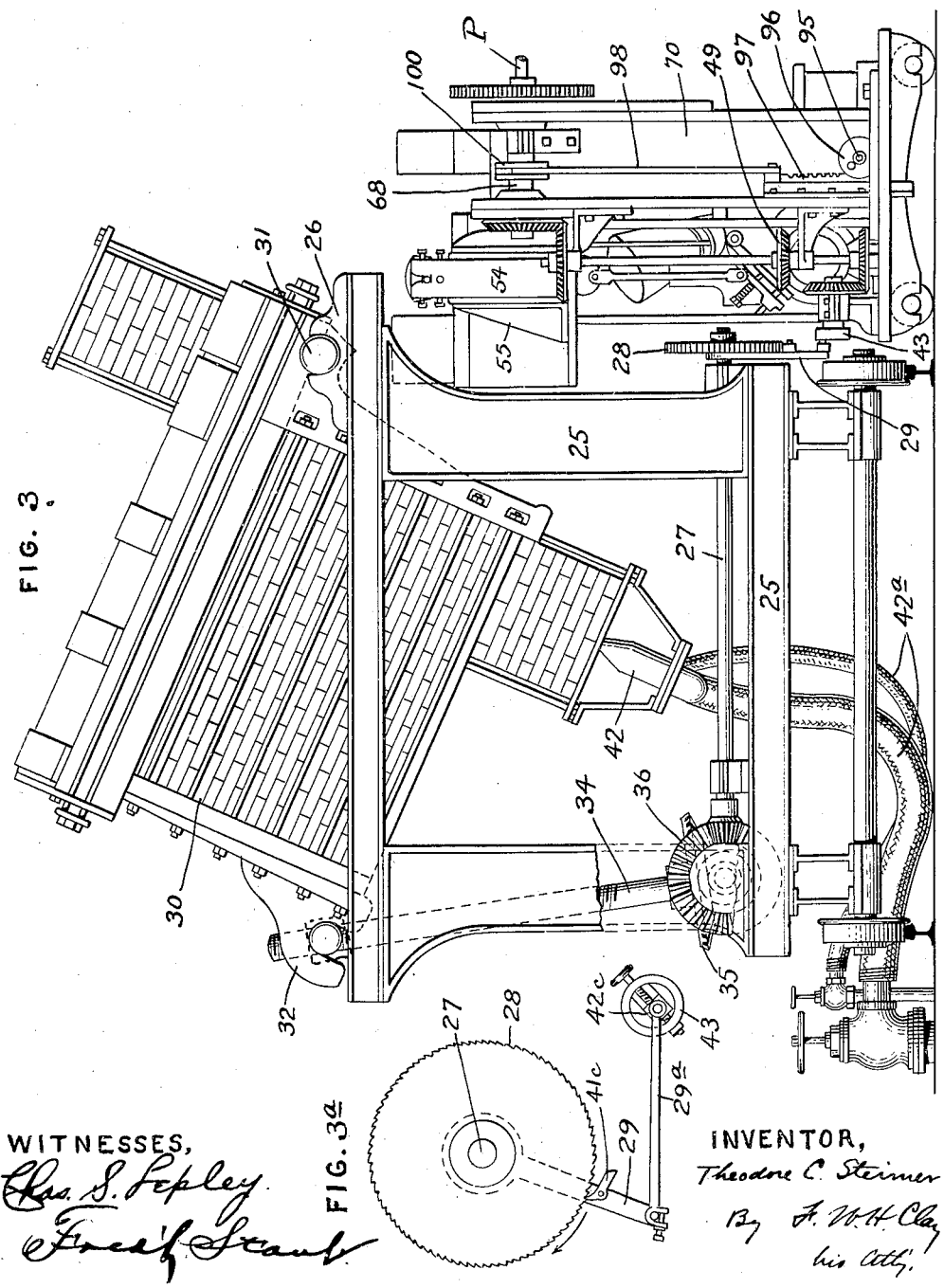

March 9, 1937.  T. C. STEIMER  2,073,571
GLASSWORKING APPARATUS
Filed Feb. 12, 1910  10 Sheets-Sheet 3

March 9, 1937. T. C. STEIMER 2,073,571
GLASSWORKING APPARATUS
Filed Feb. 12, 1910 10 Sheets-Sheet 4

WITNESSES,

INVENTOR,
Theodore C. Steimer

March 9, 1937.  T. C. STEIMER  2,073,571
GLASSWORKING APPARATUS
Filed Feb. 12, 1910  10 Sheets-Sheet 6
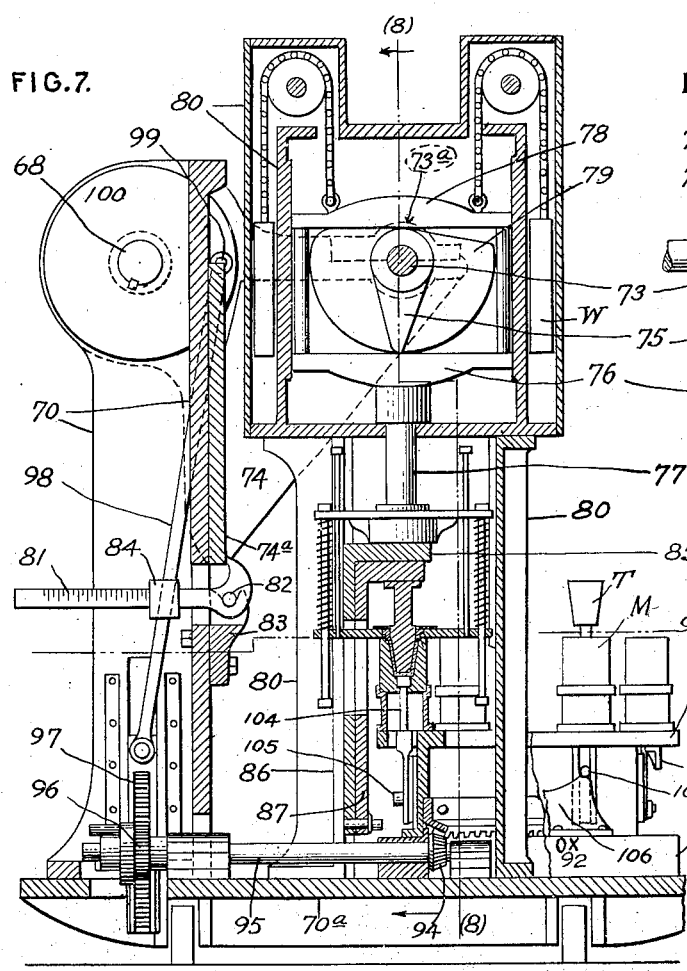
FIG. 7.
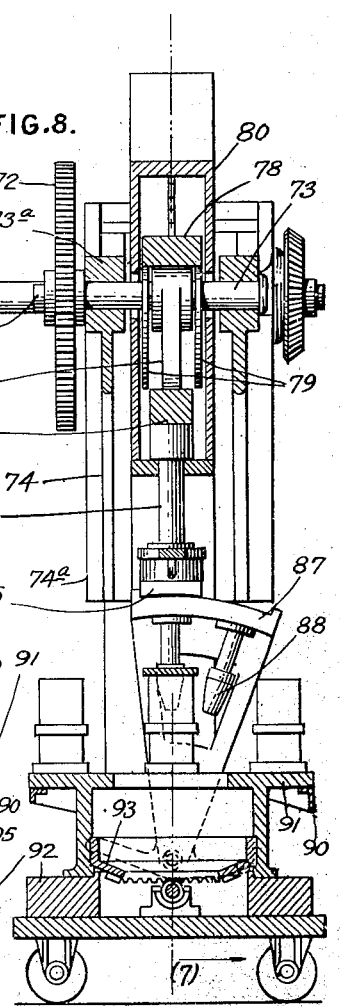
FIG. 8.
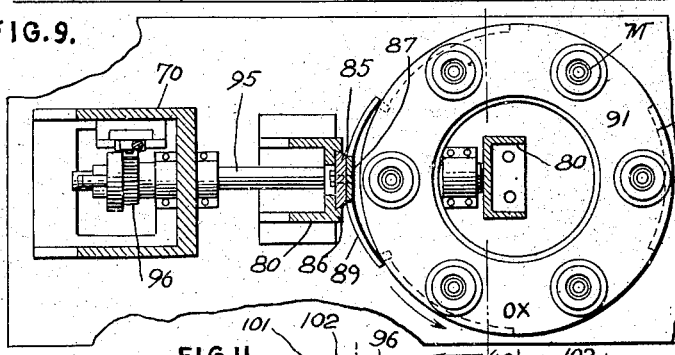
FIG. 9.
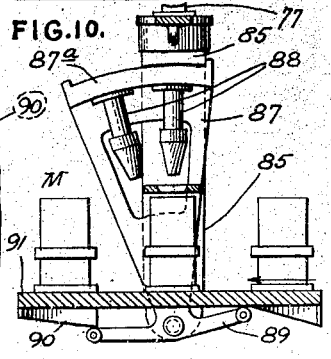
FIG. 10.
FIG. 11. 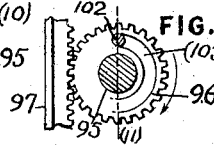 FIG. 12.
WITNESSES,
Chas S. Copley
Fred L. Strauss
INVENTOR,
Theodore C. Steimer
By F. M. H. Clay
his atty.

March 9, 1937.   T. C. STEIMER   2,073,571
GLASSWORKING APPARATUS
Filed Feb. 12, 1910   10 Sheets-Sheet 7
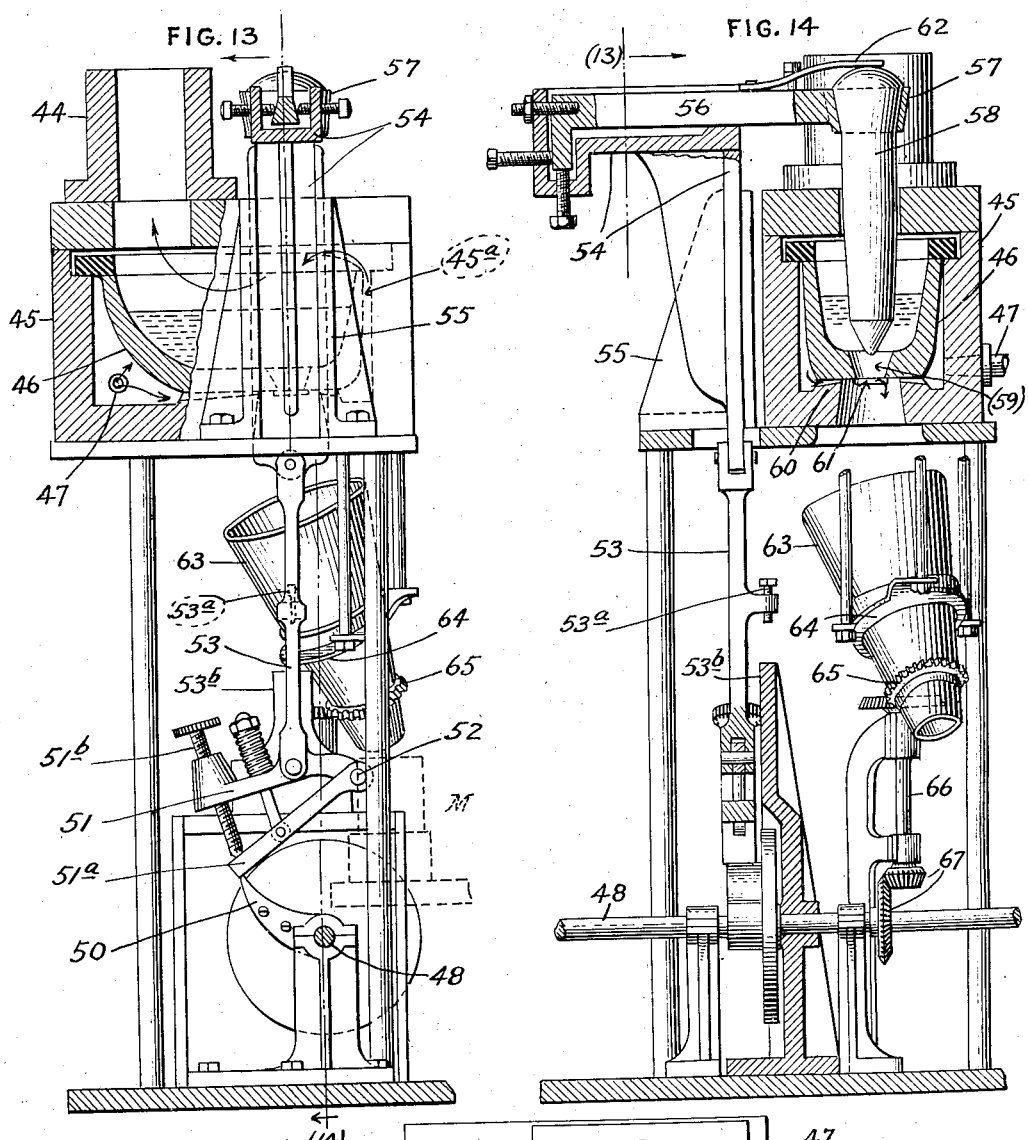
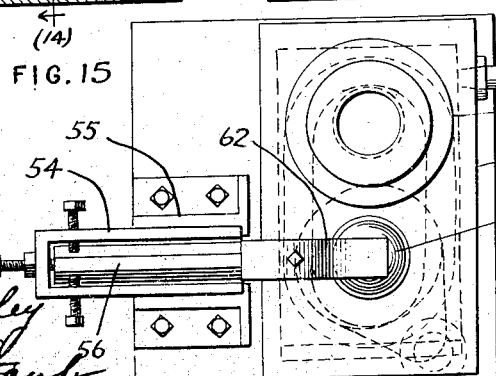
WITNESSES,
INVENTOR,
Theodore C. Steimer

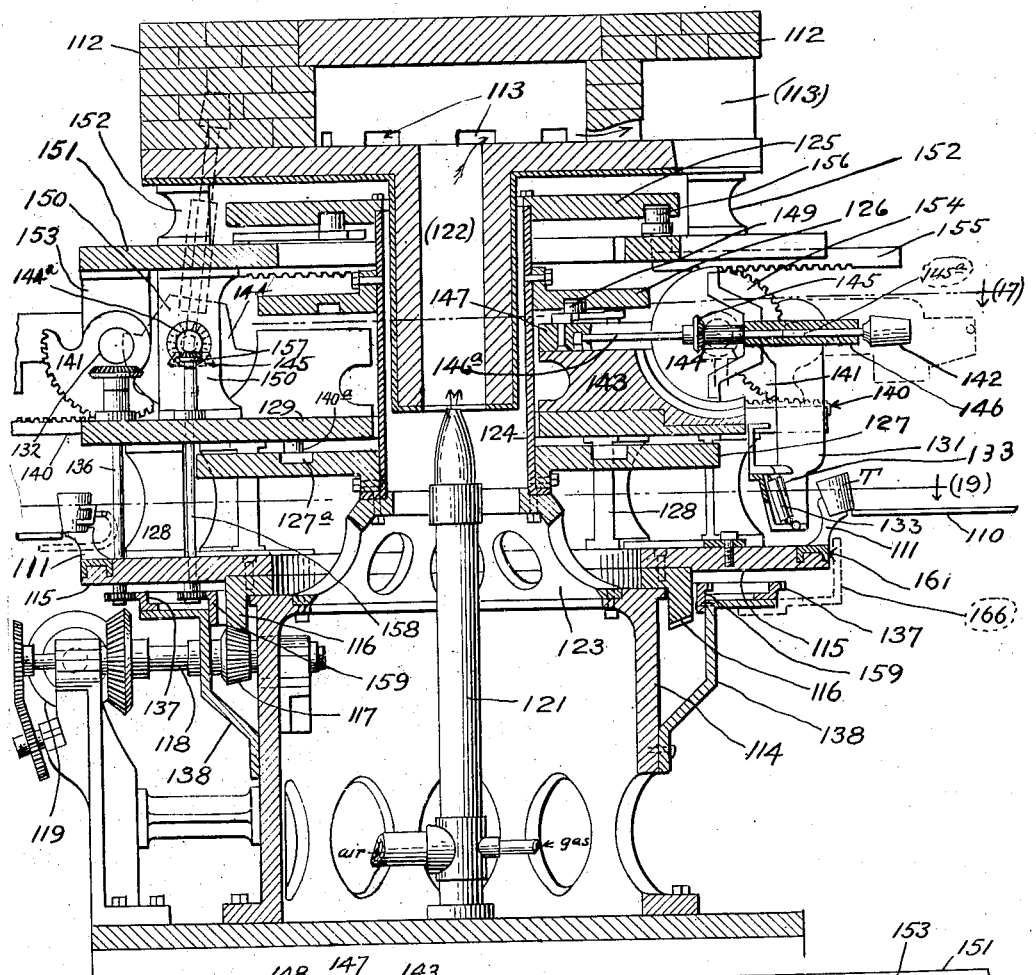

March 9, 1937.　　　T. C. STEIMER　　　2,073,571
GLASSWORKING APPARATUS
Filed Feb. 12, 1910　　　10 Sheets-Sheet 9
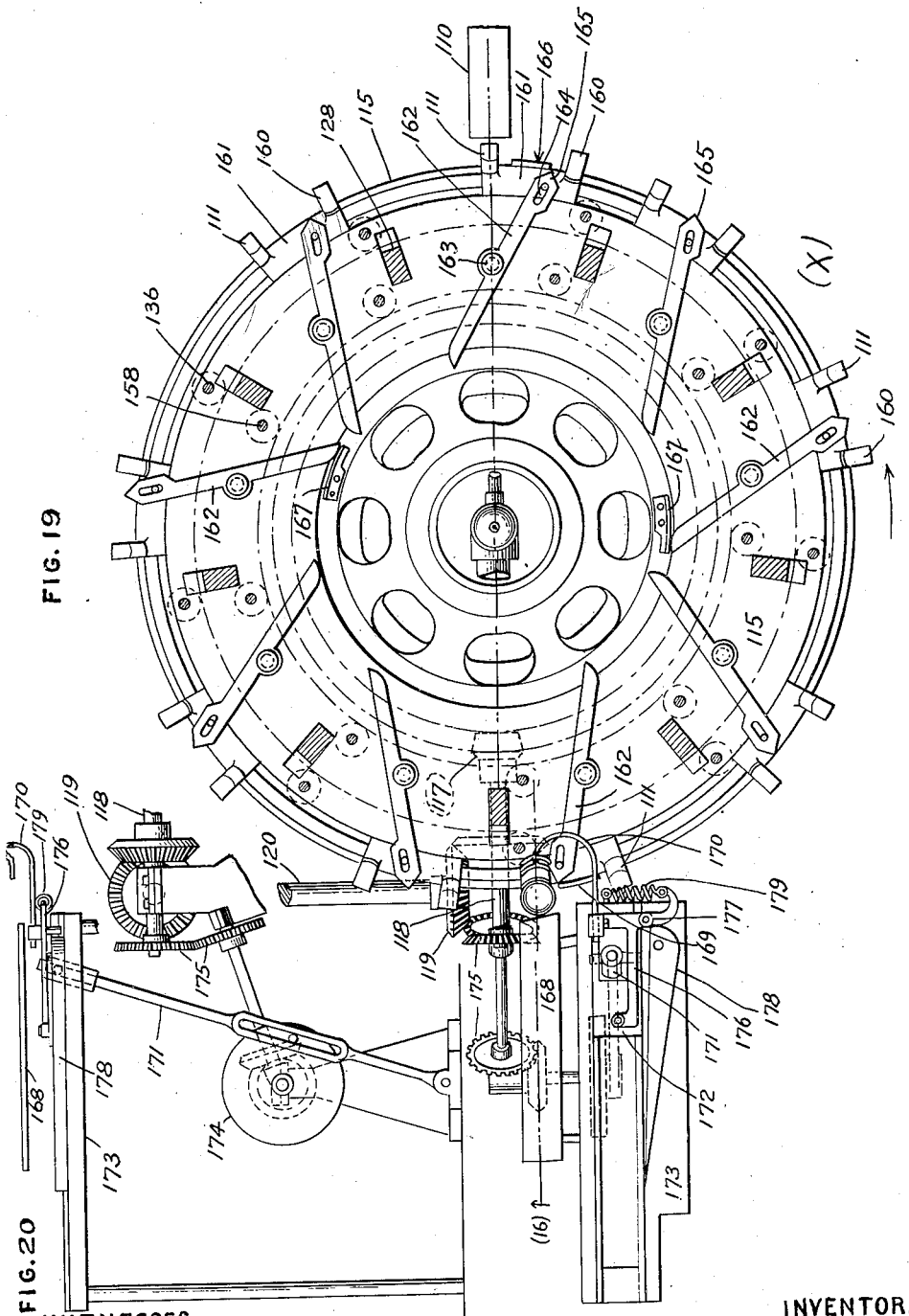
INVENTOR,
Theodore C. Steimer March 9, 1937. T. C. STEIMER 2,073,571
GLASSWORKING APPARATUS
Filed Feb. 12, 1910 10 Sheets-Sheet 10

WITNESSES,
INVENTOR,
Theodore C. Steimer

Patented Mar. 9, 1937

2,073,571

UNITED STATES PATENT OFFICE

2,073,571

GLASSWORKING APPARATUS

Theodore C. Steimer, Dormont, Pa., assignor, by mesne assignments, to Hartford-Empire Company, Hartford, Conn., a corporation of Delaware Application February 12, 1910, Serial No. 543,582

7 Claims. (Cl. 49—55)

My invention relates to the art of making pressed or blown glass articles such as tableware and the like, and more particularly to means for continuously and automatically making glass articles in one continuous series of machines. The primary objects are to provide a set of co-operating machines to carry out the complete process, from the melting of the metal to the point of packing of the articles; to provide efficient means for regulating the size and weight of the articles, and generally to properly co-ordinate a set of machines performing the different necessary operations. More specific objects are to improve the construction and operation of melting furnaces, and to provide for continuously feeding charges for pressing or blowing machine molds or blanks; to improve the operation of pressing machines; to provide an automatic glazing or fire-polishing machine; to provide an automatic collecting machine for placing the finished articles in the lehr for annealing; and other specific improvements which will hereinafter appear. I have illustrated the apparatus in its collected form and also the individual machines, in the accompanying drawings, in which—

Fig. 1 is a diagram showing in side elevation and partial section a complete assembled apparatus for making tumblers, for example; and Fig. 2 is a continuation in plan diagram, showing the method of operating the collecting and delivering machine for the lehr.

Figure 4:
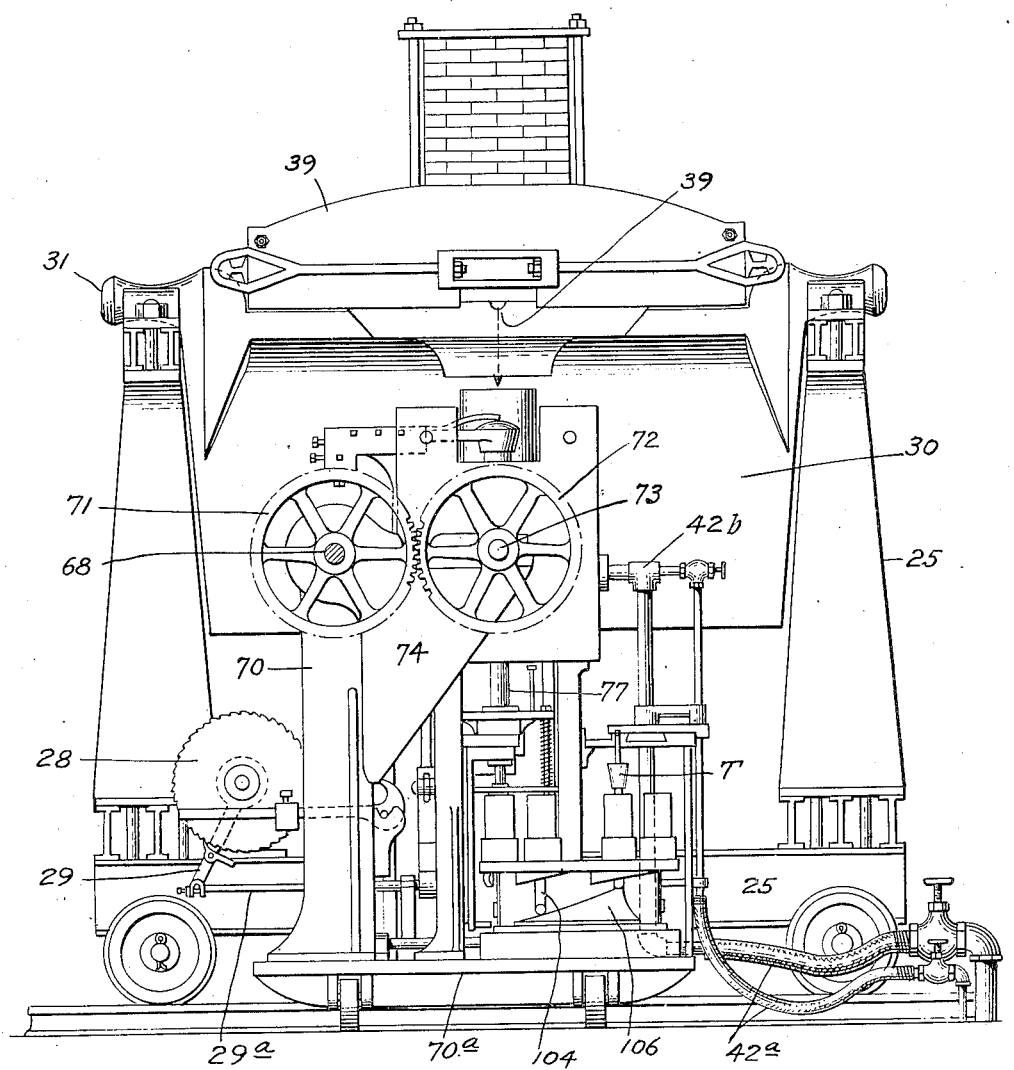
Figure 5:
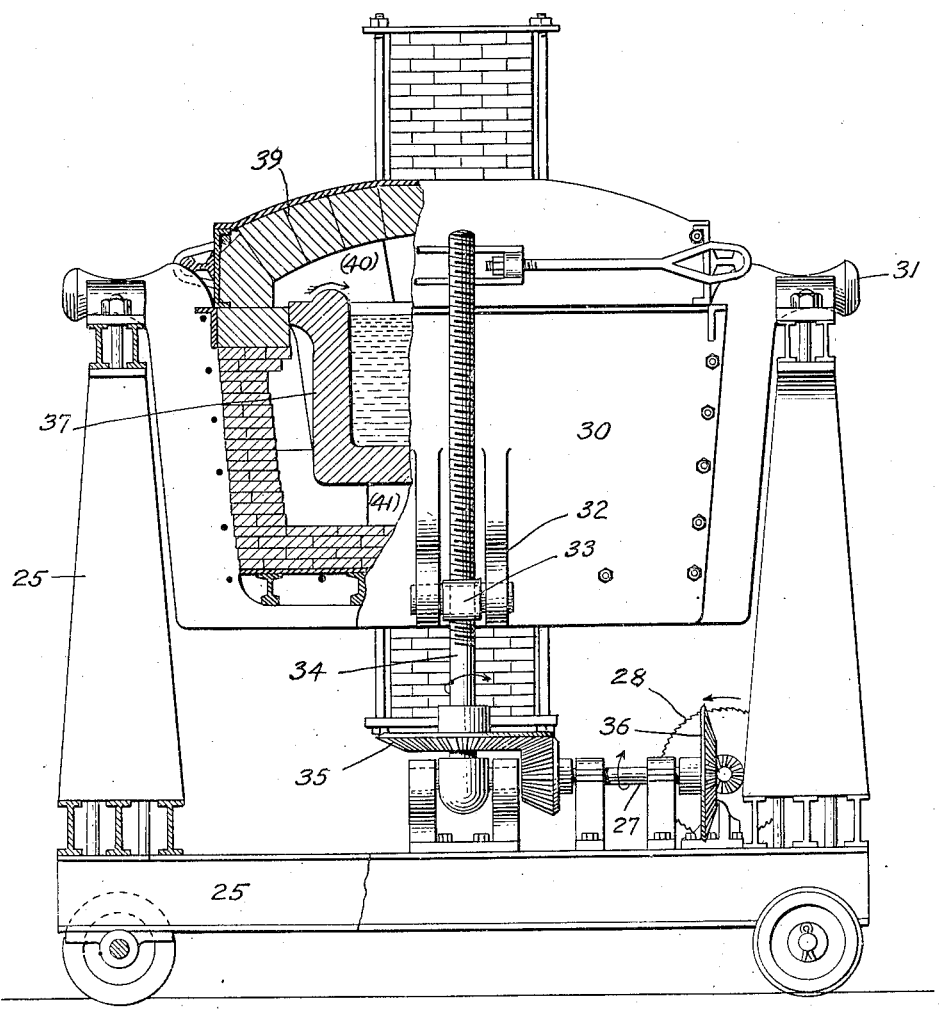
Figure 6:
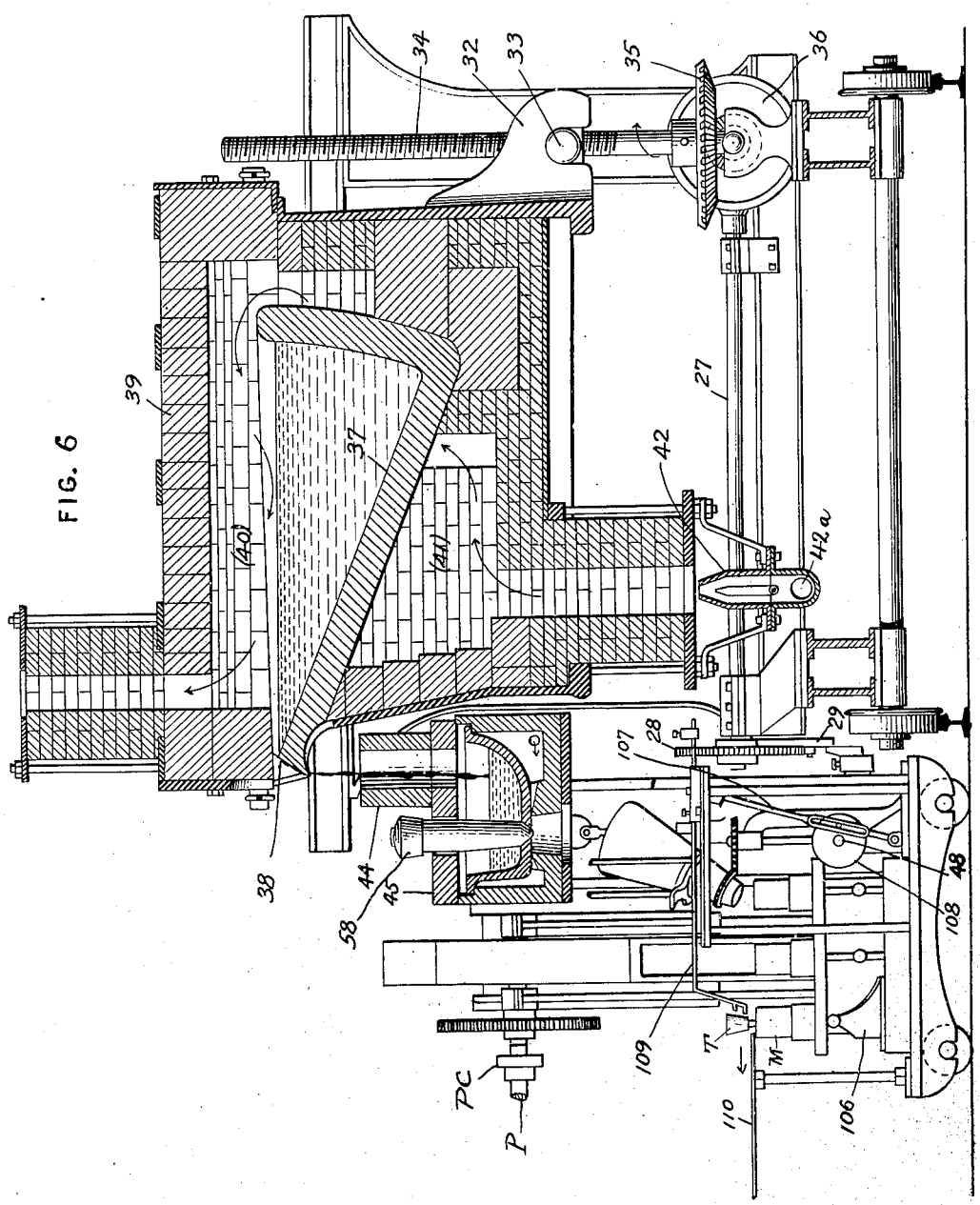
Figure 21:
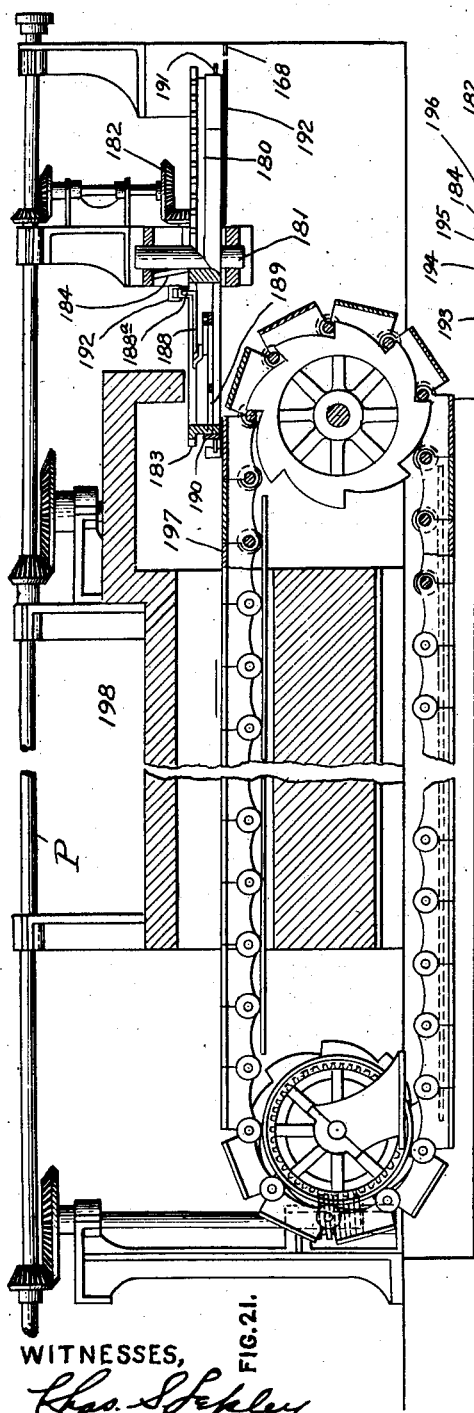
Figure 22:
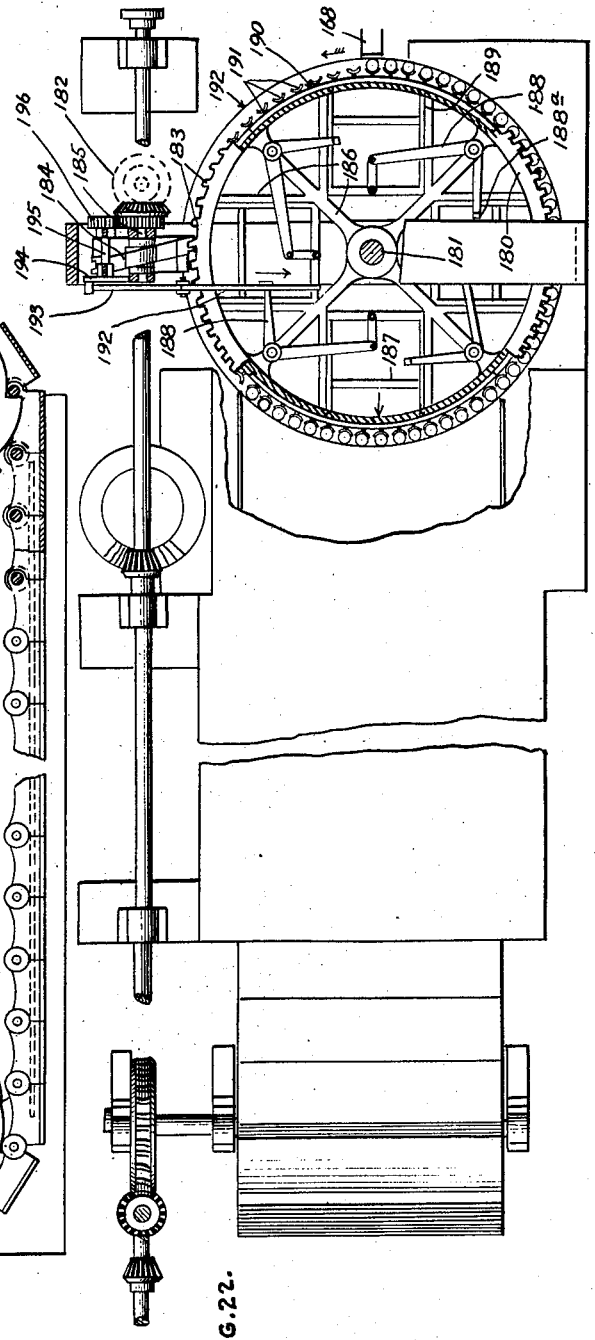

Fig. 3 is a side elevation of the melting and pouring furnace tilted in position to entirely empty its charge, showing also parts of the pressing machine; Fig. 3a is a detail of mechanism for operating the tilting of the furnace, as will be hereafter described. Fig. 4 shows another elevation of the pressing machine and a front elevation of the melting and pouring furnace. Fig. 5 is a rear elevation and partial section of the furnace and Fig. 6 is a central vertical section of the furnace, showing a full charge of molten glass therein; also the delivery pot, and a side elevation of the pressing machine. Fig. 7 is a vertical section taken through the center of the pressing machine, also showing some of the molds in elevation, the section being on the line (7) in Fig. 8. Fig. 8 is a section taken on the line (8) of Fig. 7, showing especially the operation of the press plunger. Fig. 9 is a horizontal section on the line (9) in Fig. 7. Fig. 10 is a detail showing in side elevation the shifting complementary plungers in another position. Figs. 11 and 12 are details, respectively in vertical section and side elevation, of certain parts of the driving mechanism for the table of the press. Fig. 13 is a partial side elevation and partial section showing the mechanism for measuring the glass and feeding the molds, the section being taken partly on the line (13) in Fig. 14. Fig. 14 is a section on the line (14) in Fig. 13, and elevation of a different view of the same mechanism; and Fig. 15 is a plan view of the glass measuring and feeding pot. Fig. 16 is a vertical central section of a machine for fire-polishing the articles. Fig. 17 is a partial section and plan on the line (17) in Fig. 16, showing the means for operation of the carrier for the fire-polishing machine; and Fig. 18 is a partial front elevation of the lifting device and shaper for the glass articles seen at the right of Fig. 16. Fig. 19 is a plan view of the table in Fig. 16, and a section on the line (19) therein. Fig. 20 is a side elevation showing in detail the transporting devices appearing in plan at the left of Fig. 19. Fig. 21 is a vertical central section through the annealing lehr and the collecting and delivering machine therefor, and Fig. 22 is a plan view showing this latter more particularly.

The problem of manufacturing such articles as tumblers for example, entirely automatically, has not to my knowledge been heretofore attacked; and it will be understood that one of the difficulties to be met is to properly co-ordinate the different machines necessary to be used. Heretofore the glass has been melted in a pot or a large fixed melting tank, which is stationary, and the glass as used has been taken out by various handling machines such as dippers, or suckers or by hand blow-pipes or hand punty rods when the articles are to be either blown or pressed. In the making of pressed tumblers it has been customary to simply gather out the glass on hand punties and feed the proper quantity to a mold by dropping the glass from the punties into the molds and cutting off the required amount manually, the skill of the operator being depended on to get the right amount for making the article. Where it has been proposed to use machines for feeding glass, the feeding device has been attached to the melting furnace and it was proposed to get the right amount of glass by some form of shearing machine to cut off a flowing stream, but this has been a failure on account of the impossibility to cut off cleanly, and for other reasons.

The press has been fairly well developed, as illustrated in my prior Patent No. 870,649, of 1907. It has been customary where fire-polishing was necessary to manipulate the article largely by hand, the article being invariably carried to and taken from the finishing machine, even where it was attempted to automatically rotate the article in the heating flame. It has also been customary to place the articles in a lehr by hand. And in short, so far as I am aware there has been no attempt to entirely eliminate hand operations in the manufacture of such articles. The herein set forth apparatus is to accomplish this object and incidentally I present separate and distinct improvements in each one of the various co-operating machines.

First, to briefly explain the general nature of the invention, I refer to Figs. 1 and 2, wherein I present in diagram the whole apparatus. Mounted on a truck, I show a frame 25 carrying a melting and delivering furnace 30 which is pivoted at 31 and pours out the glass constantly at a fixed head by reason of its construction and through the agency of the screw 34. The glass flows in an unbroken stream into the interrupter chamber 45, where, by means of a reciprocating interrupter 58, it is divided up into charges which drop through the funnel 63 into a series of molds M on the table 91 of a pressing machine, where the charge of glass is automatically pressed and delivered as shown at T in completed form. In the case of rough ware like jelly glasses, of course the step of fire-polishing is omitted and the tumblers are here taken up by the collector. But in the full apparatus here illustrated, the tumbler T is next placed upon a rest 111 on the table 115 of the fire-polishing machine, where it is taken up automatically by lifting devices 131 and 142, inserted into the glory hole 113, and afterwards delivered by the transporting devices to a rest 160 and by a carrier arm 170 delivered to the collector 180. This machine is shown more clearly in Fig. 2, and is designed to take up the tumblers one at a time, as the collector table rotates past the delivery point of the carrier 170, and afterwards, by an outward motion of the movable section 190 of the collector table, a whole row of the articles is shoved onto a moving carrier 197, which passes slowly through an annealing lehr 198 and eventually brings the tumblers out completed and on a packing table which is a continuation of the traveling table in the lehr. All the operations just described are performed without any manipulation of the article by hand, and the apparatus is provided with means for making the articles of uniform weight and size and treating them uniformly in the fire-polishing process, where they are automatically prevented from becoming misshapen.

Having thus given a general idea of the functions of the combination of machines, I will now describe in particular the several distinct elements of the combination.

First, the furnace, which is shown in Figs. 3, 4, 5 and 6. In order that the manufacturing process may be continuous, day and night, I contemplate using several of the furnaces, and if necessary additional presses may be provided to take the place of one needing repair. The entire apparatus is designed to be operated from a single power shaft P, but nevertheless the furnace is portably mounted and may be removed and replaced by another.

On a frame 25 of any suitable construction, I provide a stationary bearing 26 and a movable bearing 32 to carry the furnace. All the operations necessary to move the furnace are provided for by a shaft 27 driven by a gear 28 and ratchet arm 29 shown in detail in Fig. 3a and hereafter described. It is sufficient at this point to say, that the furnace may be entirely removed by merely disconnecting the air and gas pipes in the usual way, and lifting the driving link 29a off of its connecting pin on the arm 29. The furnace 30 may be built in any usual construction of iron framing and the outside casing is as customary; but the entire frame and casing are supported on the fixed trunnions 31 at the front of the furnace, and bearing 32 at the rear of the furnace engaging a movable trunnioned nut 33 riding on a pivoted screw 34 which has a bearing in the frame 25 and is rotated slowly and intermittently by gearing 35 and 36 from the shaft 27.

The interior construction of the furnace is peculiar; the melting pot 37 as seen in Fig. 6 is of wedge shape, with vertical sides, so that as the furnace is tipped about its pivoting point which corresponds with the line of the pouring mouth 38, the glass is always poured from the same level and from exactly the same position in the furnace. That is, the pouring point is immovable and the whole body of the glass moves around it as a center. By this means I am enabled to drain off the entire charge of glass, leaving no residue to mix with a new charge, which would be very detrimental. The raw material for the glass may be introduced by lifting off the top 39. It will be observed that the pot 37 is in a reverberatory chamber formed by the passages 40 and 41, being heated in any convenient way, as by the air and gas burner 42 fed by any convenient form of piping 42a.

The pouring of the glass from the furnace 30, accomplished by the slow revolution of shaft 27 and screw 34, is brought about by the reciprocating movement of arm 29, which as will be seen in Figs. 3 and 3a is provided with a dog or ratchet 41c, moved intermittently and moved any desired distance to regulate the flow of glass, by means of link 29a engaging an adjustable wrist-pin 42c set in a revolving wheel 43, geared up, as will be obvious from Fig. 3, with the main power shaft P. That is, by attachment to a continually rotating element, the dog and circular rack just described will slowly and continuously tip the furnace about its pouring spout as an axis, so as to deliver a continuous stream of glass at the exact rate required. The adjustment is made without stopping the machine. The glass is always under the same conditions of temperature, pressure head, movement, etc., and the entire charge of the furnace is used up.

The stream of glass, protected by the hood 44 flows into the interrupter chamber 45 shown more in detail in Figs. 6, 13, 14 and 15. This chamber 45 has the double purpose of housing the regulating pot and interrupter, and of keeping the glass uniformly at the correct temperature. Inside the chamber 45, I provide a pot 46 having the peculiar form shown in Figs. 13 and 14, so that a gas flame introduced thereunder by a burner 47 supplied through pipes 47a provided with regulating valves 47b reverberates around the pot 46 and at the same time assists the interrupter in its functions as hereafter described. Referring to Figs. 13 and 14 especially, it will be understood that the shaft 48 may be connected up as by a gear 49 at the right of Fig. 3, with the main power shaft P therein; and on the shaft 48 is a cam 50 which reciprocates an arm 51 pivoted at 52 to any convenient part of the frame of the machine. This arm 51 has a bearing portion 51a which is adjustable in position by screw 51b so as to regulate the throw of the connected vertical reciprocating link 53, imparting motion to a frame 54 which slides in a vertical guide 55.

On this frame the interrupter stopper is mounted, with various adjustments as shown, in a ring 57 on the end of the supporting arm 56. This stopper has a conical end which just fits a conical outlet 59 in the pot 46, so that when the stopper is down it approaches closer to the surface of the opening 59 and stops the flow of glass through the same. It will be understood that the downward motion of this stopper 58 ends at a fixed position which may be regulated by screw 53a on the link 53 striking a projection 53b on the frame of the machine. And it will be noted that though positively raised by arm 56, the stopper may fall immediately by gravity when the cam 50 escapes, so that it is governed by the conditions of the glass.

The pot 46 is seated on an upwardly projecting boss 60 in the interrupter chamber 45, and this boss is provided with several radial slots 61 through which a fine flame constantly plays immediately under the outlet of the opening 59. The several jets of flame are projected toward a common center and have the effect of completely melting and cutting off the charge of glass delivered by the rising and falling of the stopper 58. It will be understood that the volume of this flame is sufficiently large to give a strong blast for this purpose as well as to reverberate on top of the pot 46, through the opening 45a shown in dotted lines in Fig. 13. The stopper 58 is held in the head 57 by a leaf spring 62. The amount of glass flowing into the pot 46 being carefully regulated and entering in regular pulsations, the motions of the stopper 58 are timed correspondingly and carefully adjusted in extent so that the same amount of glass which flows into the pot 46, also flows out each time the interrupter is lifted to supply the molds. Thus the level of glass in the pot remains constant, which means that the head or pressure at the outlet is always the same, and the temperature conditions being also constant, the same charge of glass at the same consistency is invariably fed to the molds. According to the size of the article being made, the rate of flow of glass is easily regulated by adjusting the position of the wrist pin 42c (Fig. 3a), and the position of the bearing arm 51a in Fig. 13. The action of this glass feeding device is peculiar in that instead of attempting to cut off a string of glass as heretofore, I merely interrupt the stream of glass by partially obstructing the outlet, and meantime heat the glass to a high temperature at the point 61 so as to separate the mass in the pot 46 from the falling charge of glass in liquid form very much as a drop of water is separated from the main body by surface tension. That is, the charge carries with it in a spherical form all of the glass separated off from the main body by the thin sheet of gas flame. The effect of this intense local heat is that the highly heated liquid glass will be forced by the flame either to follow the charge or to travel back into the opening 59, so that there is no possibility of a tail or string of glass either hanging to the outlet or following the charge.

Of course, the charge of glass from the interrupter may be allowed to drop directly into the mold when desired, but I have illustrated in Figs. 13 and 14 an improvement which consists in a conical chute 63 mounted in the frame 64 so as to revolve freely and carrying a gear 65 which is driven through shaft 66 by gear 67 on the shaft 48. This cone stands over the momentary position of the mold M in its place on the press. It will be noted that the spherical charge of glass dropping into the cone will be kept in spherical form and at the same time prevented from sticking by reason of the rapid motion, and furthermore chances of irregular cooling will thus be reduced to a minimum. The success of a press mold depends very largely upon introducing the glass in proper condition, and it will be noted that I thus avoid the common defect of introducing a charge of glass which has been made cold in one spot by contact with the shears.

The pressing machine is illustrated in detail in Figs. 7 to 12, but it will be best seen from Figs. 4 and 6 that the interrupter and press are both mounted upon the same portable frame and the main power shaft P is provided with a clutch PC (Fig. 6), so that it is separable. The continuation of this shaft is shown at 68 in Figs. 4, 7 and 8, where it is mounted in bearings 69 of the press frame 70 and carries a gear 71 meshing with another gear 72 on a shaft 73 mounted in bearings 73a on the pivoted frame 74. This shaft 73 carries a cam 75 for engaging the cross-head 76 of the main press plunger 77, and the cross-head 76 is connected to or made integral with another cross-head 78 which is engaged by two cams 79 also keyed on shaft 73 and arranged to lift the plunger 77. The plunger and cross-heads are preferably counter-weighted by weights W mounted on the frame 80 which rests upon the same base 70a as the press frame 70 carrying the shaft 68. This frame 80 stands between the two side wings of the pivoted frame 74, as will appear from Fig. 8 and while the frame 80 is stationary, just like the standard 70, the frame 74 is pivoted at 68 and its lower or tail portion 74a rests against the stationary standard 70. If there is induced any excess pressure on the plunger 77, it will be seen that the plunger and its operating cams and shaft can all rise by lifting the frame 74 and rotating it around 68 as a center. It is held down, however, by its own weight and by the additional provision of a lever 81 whose pivot 82 rests in bearings 83 on frame 70 and which has a hooked end engaging the tail of frame 74 to hold it against the standard 70. The lever 81 is graduated and has a sliding weight 84 by which to accurately regulate the limiting pressure of the plunger. This enables me to avoid excess pressure and treat all the articles alike in the presses, the plunger giving way even if there should be too much glass in the mold, instead of crushing or crizzling the glass.

The main plunger 77 carries integral with it a frame 85 which reciprocates in guides 86 and has pivoted to its bottom (as shown more clearly in Fig. 10), a complementary oscillating frame 87 which carries two complementary plungers 88 fixed on the rim 87a. These complementary plungers are alternately brought in position over the molds M by the engagement of a pair of integral arms 89 on frame 87, with cams 90 fixed on the bottom of the revolving table 91 of the press.

This table 91 carries any convenient number of molds M, and it is moved in a step by step motion, on the bearing plate 92 by means of a conical gear 93 fixed inside it and engaging a bevel gear 94 on the shaft 95. This shaft 95 is operated intermittently by a pinion 96 engaging a vertically reciprocating rack 97 operated by a link 98 attached to a wrist pin 99 on two discs 100 fixed on the interrupted shaft 68. It will be understood that by the constant rotation of these discs on shaft 68 the rack 97 is continuously reciprocated, and in order that the press table may be driven by shaft 95 always in the same direction, I provide on the shaft 95 a keyed disc 101 which carries a spring-pressed retreating bolt 102 engaging an inclined slot 103 in the side of the pinion 96; this pinion 96 riding freely on shaft 95 in one direction, but being engaged by bolt 102 in the opposite direction and thereby intermittently revolving the shaft 95.

It will be understood that the mold table brings the molds M successively under the position of the main plunger 77, and by this revolving motion alternately shifts into alignment the two complementary plungers 88, which are thus driven into the mold in the usual way; but it is to be noted that by this means I have always a cold plunger to press the glass and this very much increases the speed of the machine without danger of sticking or overheating. From the position under the plunger, the glass in the molds is cooling until it reaches the position OX as shown in Figs. 7 and 9, when the tumbler T is ejected by the rising of a valve 104 whose stem has a roller 105 at this time engaged with a cam track 106, fixed to the bed-plate 92 of the machine. (This is shown more plainly in Fig. 4.)

Referring to Fig. 1 again, it will be understood that the tumbler T is now in position to be pushed over on to the rest 111 of the fire-polishing machine. This is accomplished by a transfer device on the press base and consisting of a slotted lever arm 107 (Fig. 6) reciprocated by a wrist pin on a rotating disc 108 attached to the shaft 48 of Fig. 14, and pivoted to a longitudinally reciprocating bar 109 as shown in Fig. 6. This bar 109 pushes the tumbler T across the table 110 and onto a rest 111 of the fire-polishing machine shown in Fig. 16.

The usual construction of a fire-polishing furnace, or so called "glory hole" will be understood without description. In the machine shown in Figs. 16 to 20, the furnace proper 112 revolves, and the mechanism for placing the articles in the openings 113 therein moves in a plane fixed relative thereto, while the supports for the rests 111, travel intermittently with the mechanism for lifting the article therefrom. It will be best first to describe the transporting devices.

On a frame or standard 114, I mount a table 115 which is continuously rotated by a bevel gear 116 and a pinion 117 on shaft 118 which by gears 119 and shaft 120 is connected in any convenient way with the main power shaft P, before described. The fire is furnished by a burner 121 in the center of the frame 114 entering the throat 122 of the furnace 112, and this latter is supported indirectly on the rotating table 115 as hereafter described. An extension 123 of the frame 114, carrying a fixed cylinder 124 supports fixed cam plates 125, 126, and 127. All the other parts of the machine revolve. The revolving table 115 is provided around its outer edges with studs 128 supporting a plate 129 which in turn carries a series of stationary blocks 143 and stanchions 150 supporting plate 151, and these in turn by supports 152 carry the furnace 112. Between two depending lugs 153 fixed on the plate 151, I provide a series of lifters shown in front elevation in Fig. 18. They consist of a lifting device or box 131 pivoted on pins 132 and containing a series of rollers 133 mounted therein in inclined semi-circular arrangement and driven by intermeshed gears 134 by a system of gearing 135 driven from shaft 136 which in turn is rotated by the rack 137 fixed on an extension 138 of the fixed frame 114.

It will be seen from Fig. 16 that when the box 131 hangs vertically down from its pivots 132, it stands behind the tumbler T on the rest 111. By means of a rack 140 in the plate 129, engaging a gear 141 on the pivots 132, the box is swung up to the horizontal position shown in dotted lines in Fig. 16, in which motion it passes over the rest 111 and receives the tumbler T, (as will be plain from Fig. 18) and carries it up in line with a lifting device 142. This motion of the rack 140 is imparted by the engagement of a downward depending stud roller 140a engaging the cam slot 127a in the fixed plate 127. A plan view of this rack 140 in the plate 129 is shown in Fig. 17.

Placed parallel with each rack 140 and to the plane of movement of its lifting box 131, there are fixed blocks 143 in which is guided an oscillating block 144 pivoted on a trunnion 144a in a pair of the stanchions 150. This block 144 has a forwardly extending tubular arm 146 in which is mounted the stem of the holder plug 142, and the back end of this stem 146a engages a sliding block 147 movable in ways in block 143 and reciprocated by the engagement of the pin extension 148a on arm 148. The arm 148 is pivoted on the next block 147 and it has a roller stud 149 which engages a cam slot in the fixed plate 126, above, as will be evident from Fig. 16. This shoves the stem 146a and its holder plug into the tumbler when it is in horizontal position, and then, by the engagement of a gear 154 on the trunnion 144a with a reciprocating rack 155 set in the plate 151, the tumbler is swung up into vertical position within the glory hole 113, as indicated in dotted lines at the left of Fig. 16. The rack 155 is moved by the engagement of roller stud 156 with a cam slot in the fixed plate 125. Meantime, the arm 146 of the holder plug is rotated in position by a pinion 145 engaging an idler 145a surrounding the trunnion 144a and driven by a pinion 157 on shaft 158 which in turn is driven by means of rack 159 also fixedly mounted on the base extension 138 which carries the rack 137.

While the tumbler is in the fire of the glory hole, it will be observed that the edge of the tumbler next the fire is in a vertical position to avoid any distortion, and meanwhile it is rotated so that it is heated evenly all over. By the time the machine is rotated through 120 degrees or any other desired distance, the cam slots reverse all the motions just described; the supporting arm 146 lowers to a horizontal position and deposits the tumbler again in the revolving rollers 133 of the lifting box 131, and eventually this returns to vertical position leaving the tumbler on the rest 111 as shown at the left of Fig. 16. The tumbler in handling has been constantly operated on to keep it moving and maintain its shape, it being understood that the rollers 133 will in each case be made to exactly fit the sides of the article being made. The tumbler is now finished and is carried into the lehr as hereafter explained.

Coming now to the horizontal movements of the supports for the tumbler; it will be seen from Figs. 16 and 19 that these supports 111 and 160 are carried on sliding blocks 161 which are set in the revolving table 115 and are free to move. Referring to Fig. 19, especially, these tumbler supports are arranged in pairs, there being one of each kind on each of the sliding blocks 161. It is necessary not only to bring them into register with the table 110 intermittently, and leave them stationary for a moment, but also necessary to alternate their position under the lifting devices 131 and 142, which are continuously moving around the machine. For this purpose I mount upon the traveling table 115 a series of transporting arms 162 pivoted at 163 and by means of a slot 164 engaging a pin on the sliding block 161. The end 165 of each arm 162 projects beyond the circumference of the table 115 and as it arrives near the position of table 110 so that the support 111 is in position to receive the tumbler, it strikes a stationary lug 166 which prevents its further motion until the tumbler has been put in place and the end 165 slides past the fixed lug 166. When this escapement happens, of course the block 161 is again carried along with the table 115 so that the tumbler support 111 is in register with the lifting devices as before described. While the tumbler is being transported and treated in the glory hole, the receiving holder 160 is brought into register with the lifting devices, by the striking of the arm 162 on one of the fixed lugs 167 seen in Fig. 19, so as to cause the receiving holder 160 to take the relative position formerly occupied by the holder 111.

The operation of fire polishing having been completed, the tumbler is returned to original position and at such time it is placed upon the holder 160. This does not occur until the table 115 has made five-sixths of a revolution; that is, after the arm 162 has struck the second lug 167 shown at the bottom of Fig. 19, so that the tumbler after being finished has been carried from about the position marked X in Fig. 19 to the delivery point at the left of the figure. But whenever the support 111 passes the table 110 it is stopped in register therewith, and when the receiving support 160 arrives at the position opposite the receiving table 168 at the left of Fig. 19, it is stopped in register therewith. But immediately thereafter, the arm 162 strikes another fixed lug 169 and shifts the other holder 111 into line with the lifting devices. Meanwhile the carrier arm 170 takes the tumbler off support 160 and shoves it across the table 168 into the collector by means of the reciprocating motion of a lever arm 171 engaging the sliding block 172 in the slotted table 173. The arm 171 is moved by a pin-and-slot engagement with a disc 174 operated by gearing 175 from the power shaft 118. The lateral motion of the carrier arm 170, necessary to enable it to go behind the tumbler on the rest 160, is attained by pivoting on the block 172 a frame 176 immediately supporting the carrier arm 170, and this frame is swung on its pivot by engagement of roller stud 177 with a cam switch 178 on the table 173. The frame 176 is returned to normal position by spring 179.

In Figs. 21 and 22, I have shown the annealing lehr and the traveling table and the collecting and delivering machine with a general view of the arrangement of the power shaft. It will be understood that the carrier arm 170 has brought the article into position across the table 168 and these articles are to be taken up one by one. For this purpose the collector consists of an intermittently revolving table 192 mounted on a shaft 181 driven from any convenient gearing 182 from the power shaft P. The only peculiar thing about the gearing is the immediate engagement of the table with the driving gear. This table 192 is provided on its upper flange with a continuous series of studs 183, (preferably provided with rollers) acting as gear teeth, and engaging interrupted worm cam 184, having its cam slot arranged so as to move the table a definite distance intermittently, while its shaft continuously rotates. The rotating frame-work supporting the table 192, has as a part of it, a series of guides 186 in which radially slide frames 187, movable by links and bell crank levers 188 as hereafter described, the side arms 189 of the frames 187 passing through the rim of the table, and supporting on the outside of the rim a series of separate ring sections 190 on which are fixed a series of forks 191. The supporting table 192, serves to maintain the tumblers in position within the forks 191 after they are placed there by the carrier arm 170 sliding them over table 168. It will be understood that one of these forks 191 momentarily stops at the table 168 with each revolution of the driving cam 184. Thus the articles are collected one by one and carried around to the position shown within the lehr 198 and over the traveling table 197 therein. The ring sections 190 are adapted to the size of the lehr table and when one of them arrives at the delivery position as shown in Fig. 22, an upturned stud 188a on the tail end of the bell-crank lever 188, arrives within a notch in the reciprocating bar 192a. This is moved by a link 193 engaging a wrist pin on crank arm 194 on shaft 195 driven from shaft 185 by gear 196. The inward movement of the bar 192a thus causes a radial outward movement of the frame 187 which happens to be at this point at this time, and by this outward movement of the carrier ring section 190 thereon, the whole row of tumblers supported by it is shoved off of the table 192 on to the traveling table 197 of the lehr 198. This motion being quickly performed does not interfere with the continuous motion of the lehr table and it will be of course understood that the articles are carried slowly through the lehr in the usual way. Of course, the movements of the collector machine and the lehr table are so timed that the sets of articles are placed in proper order as shown in Fig. 2.

Briefly the operation of the apparatus is as follows:

The glass having been properly mixed and melted in the combined melting and pouring furnace pot 37, it will be understood that the glass flows in a continuous or unbroken stream through the spout 38 into the interrupter chamber. Although the screw 34 tilting the furnace has an intermittent step-by-step movement, this is a very slow movement and the changes of position are so small that they do not interrupt the continuity of the out-pouring stream. The machines are so timed that the lifting of the interrupter stopper 58 practically corresponds with the pulsation of the flowing stream maintaining the constant glass level in the pot 46. This interrupter stopper 58 rising at the proper time allows a flow through the outlet 59 and then stops the flow by constricting the passage and meanwhile the constantly playing flame in the slot 61 separates the mass of glass in a practically spherical form when it drops into the revolving cone 63 and thence into the mold M, which happens to be in place thereunder. The interrupting mechanism is geared up to the press and consequently the motions are exact and the amount of glass is exactly measured off to suit the molds being used. From the receiving position of the mold as indicated in Fig. 13 it passes by reason of the revolution of table 91 in a step-by-step movement until the mold comes under one of the complementary plungers 88. The plunger is then depressed by cam 75, the pivoted frame 74 relieving the pressure at the proper point, and then the plunger being raised by cams 79. The complementary plungers 88 are alternated in successive molds. The stopping of the mold under the plunger is accomplished by the interruption of the travel by return of pinion 96 in its idle position as it is driven by rack 97. As the tumbler comes to the position indicated in Fig. 6, it is ejected from the mold M by the stem of the valve traveling up the track 106 and immediately the tumbler is transported across the table 110 by the carrier 109, arriving at the position shown at the right of Fig. 16, on the support 111. Standing now in front of a lifting box 131, this latter springs outward and upward by movement of rack 140 and it straddles over support 111, picks up the tumbler in the nest of revolving rollers 133, lifting it to a horizontal position, while the lifting device 142 is projected outward into the tumbler and immediately lifted by operation of rack 155 and places the tumbler in the glory hole 113. As it travels around with the furnace 112, it is constantly rotated by the pinion 157 and its driving shaft 158 engaging the fixed rack and exposed on all sides to the flame. At the proper time the tumbler is again lowered by the same agencies and deposited on the rest 160 which has meantime been shifted into the relative position formerly occupied by the rest 111, through the agency of the shifting arms 162 moving sliding blocks 161 when struck by the fixed lugs 167. As the rest 160 with the tumbler comes opposite table 168, the rest and tumbler are stopped by the striking of arm 162 against lug 169 and thereupon the carrier arm 170 shoves the tumbler across the table 168 into one of the forks 191 which has temporarily been stopped in front of table 168 by the interruption of the worm cam 184 driving the table 192 by the teeth 183. When a whole section of the tumblers have arrived over the lehr table, the movable section 190 of the carrier frame, is shoved outward by the bell-crank lever 188 whose tail at this time engages reciprocating bar 192a, and thus the row of tumblers is left in the lehr as shown in Fig. 2. The tumblers are now carried through the lehr by the slow and continuous motion of table 197, and by the time they have arrived at the exposed position of the table, they are cooled sufficiently to be immediately packed.

All of these motions are accomplished from the single shaft P, and without any hand manipulation. The process may thus continue without cessation since the furnace 30 may be removed and replaced without stopping the other machinery, and similarly the press can be removed and replaced without interrupting the finishing machine and the collector and lehr. Among other advantages my invention accomplishes the complete emptying of the melting tank, the uniform pouring of the glass under absolutely constant conditions, the exact and easily regulable feeding of charges to the mold from a receptacle always at the same head of liquid glass and always of the same temperature, the delivering of the glass to the mold in a mass which is uncooled at any particular spot and of spherical form, the avoidance of any strings of glass in separating the stream into charges and without blisters or mars. Also the pressing of the articles without any variation in the amount of pressure, notwithstanding possible variation in the volume of glass in the mold, the use of a cooled plunger in each mold, the automatic transporting to the finishing machine, and the automatic manipulation therein. Also the handling of the glass article in a nest of moving rollers whereby it is not necessary to wait until they are cold and they are maintained in proper form, preventing distortion in the glory hole or in the handling of them as they are removed from the glory hole, being again subjected to the action of rollers to correct and maintain their shape; the continuous collecting of the articles one by one and delivering them to the lehr automatically in bunches properly aligned and spaced, under the continuous movement. Other advantages will readily occur to those familiar with the art, but it may be said in addition that it is a great advantage in this art to thus treat each one of a great number of articles exactly alike and to do away with expensive hand operations. The entire apparatus could be attended by one man, and after being properly adjusted it requires no attention whatever as long as the supply of glass holds out. I believe I am the first to provide a co-ordinate set of machines to automatically manufacture glass articles, in addition to which there are various points of novelty in the machines themselves as hereinafter pointed out.

I do not here claim any invention shown in, or described in connection with Figures 16 to 20, both inclusive, or in Figures 21 and 22, as the same form the subject matter of my applications Sr. No. 369,078 filed March 26, 1920, and Sr. No. 382,354 filed May 18, 1920, respectively, filed as divisions hereof.

Having thus described my invention and illustrated its use, I claim the following:

1. The process of separating molten glass into mold charges which consists in intermittently flowing the glass in an annularly converging flow to the outlet, discharging the glass periodically through the outlet, temporarily suspending the discharged glass in successive masses beneath the outlet and separating each mass from the outlet while so suspended.

2. The method of feeding molten glass from a container in mold charges which consists in controlling the discharge through an outlet below the surface of the glass while maintaining constant pressure on the surface of the glass in the container to form a succession of compact masses of the glass each temporarily suspended beneath the outlet by periodically varying the conditions at the outlet to cause a pulsatory discharge through said outlet.

3. Apparatus for separating molten glass into mold charges, including a container for the glass having an outlet, an implement projecting into the glass towards the outlet and mounted for movement towards and from the outlet, means for periodically moving said implement towards and from the outlet, and means for adjusting the position of the implement towards the outlet, and for independently varying the movement of the implement away from the outlet.

4. In apparatus of the class described, the combination of a receptacle for molten glass having a discharge orifice, an auxiliary member arranged to move vertically toward and from said discharge orifice while always leaving said orifice partially open, and adjustable means for actuating said auxiliary member, the said adjustable means being so constructed as to vary the lift of said auxiliary member without materially changing the lowest position of said auxiliary member.

5. The method of forming masses of molten glass that comprises causing glass to flow from a parent body through an opening, causing successive portions of the glass, as they emerge from said opening, to hang freely below the opening, and then detaching the said successive portions of glass before they are received in any receptacle.

6. The method of feeding molten glass from a parent body in a succession of similar mold charges, that comprises flowing glass from the parent body through a discharge outlet so that a compact mass of glass at least as great as a mold charge is accumulated by suspension of the issuing glass beyond the outlet, the suspended charge being connected with the parent body through the issuing glass, separating a charge from the mass while it is still suspended and prior to its reception in any receptacle, and repeating the several operations.

7. The method of varying the weight of mold charges of glass, each formed by flowing glass through a submerged outlet and suspending the issuing glass beneath the outlet until a mold charge is formed in suspension, and then intermitting the issue of the glass by an implement reciprocating vertically in alignment with but not contacting with a wall of the outlet, which comprises varying the limit of upward movement of the implement without changing the limit of lower position and without changing the periodicity of its reciprocation.

THEODORE C. STEIMER.

CERTIFICATE OF CORRECTION.

Patent No. 2,073,571.  March 9, 1937.

Theodore C. Steimer.

It is hereby certified that error appears in the above numbered patent requiring correction as follows: In the drawings, Sheet 1, Figure 1 should appear as shown below instead of as in the present drawings of the patent:

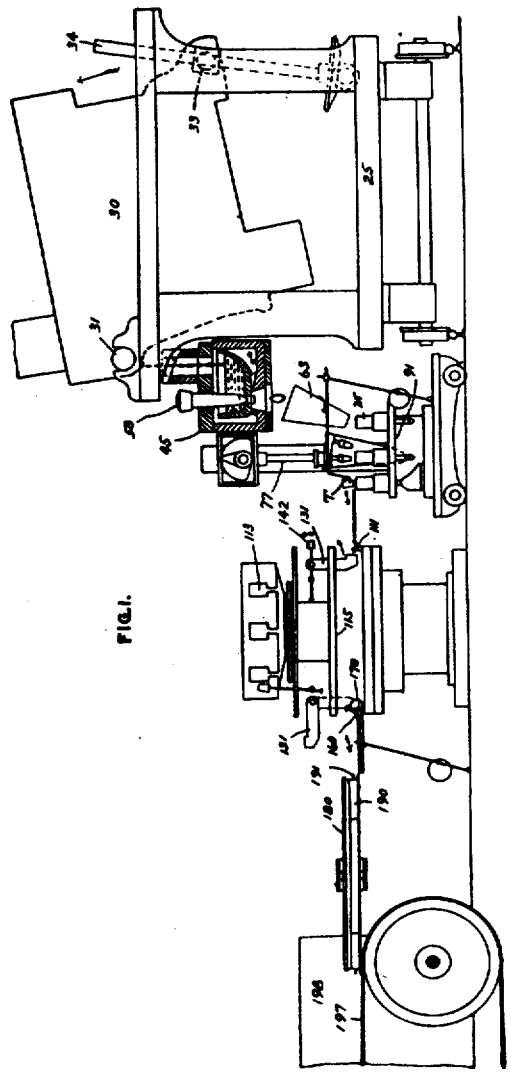

and that the said Letters Patent should be read with this correction therein that the same may conform to the record of the case in the Patent Office.

Signed and sealed this 30th day of March, A. D. 1937.

Henry Van Arsdale
(Seal)  Acting Commissioner of Patents.